United States Patent [19]
Jaffa et al.

[11] Patent Number: 5,542,056
[45] Date of Patent: Jul. 30, 1996

[54] HIGH SPEED BRIDGE CIRCUIT WITH DEADLOCK FREE TIME-SHARED BUS FOR INTERNAL INSTRUCTIONS AND PORT-TO-PORT DATA

[75] Inventors: Brent E. Jaffa, Sandy; Wayne D. Bell; John P. Giles, both of Bountiful, all of Utah

[73] Assignee: Unisys Corporation, Blue Bell, Pa.

[21] Appl. No.: 544,364

[22] Filed: Oct. 17, 1995

Related U.S. Application Data

[63] Continuation of Ser. No. 259,792, Jun. 14, 1994, abandoned.

[51] Int. Cl.$^6$ ........................................... G06F 13/40
[52] U.S. Cl. .............. 395/306; 395/308; 395/200.02; 370/85.2; 370/85.13
[58] Field of Search ...................... 395/306, 308, 395/200.02, 309; 370/85.2, 85.13

[56] References Cited

U.S. PATENT DOCUMENTS

| | | | |
|---|---|---|---|
| 4,417,334 | 11/1983 | Gunderson et al. | 370/85 |
| 5,130,981 | 7/1992 | Murphy | 370/85.6 |
| 5,331,634 | 7/1994 | Fischer | 370/85.130 |

*Primary Examiner*—Jack B. Harvey
*Assistant Examiner*—Jeffrey K. Seto
*Attorney, Agent, or Firm*—Charles J. Fassbender; Mark T. Starr; Robert R. Axenfeld

[57] ABSTRACT

A bridge circuit includes a microprocessor having a first I/O port which couples to a SCSI bus and a second I/O port which is coupled through transceivers to an EISA bus. Also, the bridge circuit includes an EISA interface controller, having control lines coupled to the EISA bus and the transceivers, which enable the microprocessor to request and use the EISA bus in time-shared fashion. In order to achieve a high speed of operation, the bridge circuit further includes a memory module, coupled via a private bus to the second I/O port of the microprocessor, which sends instructions on the private bus directly to the microprocessor, without generating any signals on the EISA bus. In addition, in order to prevent deadlocks on the private bus, the bridge circuit includes a deadlock prevention circuit which is coupled to the microprocessor and the private bus and the EISA interface controller. This deadlock prevention circuit detects the occurrence of a predetermined event during a series of data transmissions between the microprocessor and the EISA bus. When such detection occurs, the deadlock prevention circuit directs the microprocessor to stop the series data transmissions over the EISA bus and private bus before the end of the series; and it directs the microprocessor to not restart the series on the private bus until after the EISA bus is required. Meanwhile, instruction fetches on the private bus do occur.

12 Claims, 6 Drawing Sheets

HIGH SPEED BRIDGE CIRCUIT WITH DEADLOCK FREE TIME-SHARED BUS FOR INTERNAL INSTRUCTIONS AND PORT-TO-PORT DATA

This is a continuation of application Ser. No. 08/259,792 filed on Jun. 14, 1994, now abandoned.

BACKGROUND OF THE INVENTION

This invention relates to a digital bridge circuit which intercouples two completely different busses together; and more particularly, it relates to a novel structure for a digital bridge circuit by which a high operating speed is achieved without deadlocks.

In the prior art, it is common practice to provide some type of bus to which a variety of data processing units can be connected and over which those data processing units can send data to each other. Two examples of such busses are the SCSI bus and the EISA bus. These busses are industry standards; and a complete specification of the SCSI bus and the EISA bus are publicly available. A copy of the SCSI bus specification may be purchased from Global Engineering Documents, 2850 McGaw, Irvine, Calif. 92714; and a copy of the EISA bus specification may be purchased from BCPR Services, Inc., P.O. Box 11137, Spring, Tex. 77391 -1137.

Both the SCSI bus and the EISA bus include a set of data lines on which data can be sent from one unit to another. However, both the SCSI bus and the EISA bus have their own unique set of control lines and their own unique signal protocols, which are entirely different from each other. Consequently, in order for any data processing unit on the SCSI bus to send data to any another data processing unit on a EISA bus, or vice versa, a bridge circuit is required which intercouples the two busses together.

In the prior art, one such bridge circuit is described in a March, 1993 publication by PLX Technology, Inc. whose main offices are at 625 Clyde Avenue, Mountain View, Calif. 94043. This particular publication is an application note for a PLX integrated circuit chip which is designated PLX EISA 9020BV; and the publication itself is entitled, "Application Note—EISA Direct Bus Master Interface Chip for NCR 53C7X0 SCSI Processor". In that publication a circuit diagram, labeled FIG. 1, shows how the NCR 53C7X0 integrated circuit chip and PLX 9020BV integrated circuit chip may be interconnected with other support circuitry to form a bridge circuit between the EISA bus and the SCSI bus.

However, the NCR 53C7X0 integrated circuit chip is a microprocessor which sequentially reads and executes instructions during its operation; and a major drawback of the FIG. 1 bridge circuit in the above publication is that the instructions for the microprocessor are stored in a memory which must be attached to and read over the EISA bus. Thus, the reading of each instruction includes a request to use the EISA bus.

Unfortunately, an EISA bus latency time period is encountered between each request to use the EISA bus and the subsequent grant to actually use the bus. This latency time period occurs since, at any one time instant, several other data processing units will also be requesting the use of the EISA bus. Such a latency time period greatly reduces the overall performance of the bridge circuit because the instructions for the microprocessor must be read frequently.

Accordingly, a primary object of the present invention is to provide an improved structure for a bridge circuit between an EISA bus and a SCSI bus wherein a microprocessor fetches instructions with essentially no latency time.

BRIEF SUMMARY OF THE INVENTION

With the present invention, a bridge circuit is provided which intercouples a SCSI bus to an EISA bus in an improved fashion. This bridge circuit is of the type which includes: 1) a dual port microprocessor having a first I/O port which is coupled to the SCSI bus and having a second I/O port which is coupled through transceivers to the EISA bus, and 2) an EISA interface controller, having control lines coupled to the EISA bus and the transceivers, which enable the microprocessor to request and acquire the use of the EISA bus.

Further, in accordance with one aspect of the present invention, the bridge circuit includes an internal memory module. This memory module is coupled via a private bus within the bridge circuit to the second I/O port of the microprocessor, and it is used to provide instructions directly to the microprocessor without generating any signals on the EISA bus. As a result, the latency time period which is inherent in acquiring the EISA bus is completely avoided.

Also, in accordance with another aspect of the present invention, the bridge circuit further includes a deadlock prevention circuit which is coupled to the microprocessor, the private bus, and the EISA interface controller. Initially, this deadlock prevention circuit detects the occurrence of a predetermined event during the transfer of a continuous series of data words between the private bus and the EISA bus. Then, upon detecting the predetermined event, the deadlock prevention circuit directs the microprocessor to temporarily stop transmitting the series of data words even though the end of the series has not been reached, and it directs the microprocessor to tri-state its transmissions on those busses.

One specific example of the above predetermined event which the deadlock prevention circuit detects is the receipt of signals from the EISA bus which indicate that the microprocessor must temporarily stop using the EISA bus. Another example of the above predetermined event is the occurrence of an address during the transmissions which indicates that a page boundary is about to the crossed. Still another example is the occurrence of control signals which indicate that the last byte in the series of data transmission occurs on a non-double word boundary.

When anyone of the above events occur, the microprocessor is not allowed to continue its data transmissions by placing the next word of the series on the private bus until it first reacquires the use of the EISA bus. Otherwise, a deadlock can occur wherein the microprocessor is sending the next data word in the series on the private bus, and is waiting to obtain the use of the EISA bus; while at the same time, another unit on the EISA bus has acquired the use of that bus and is attempting to send data over the private bus in the bridge circuit.

3

Figure 1:
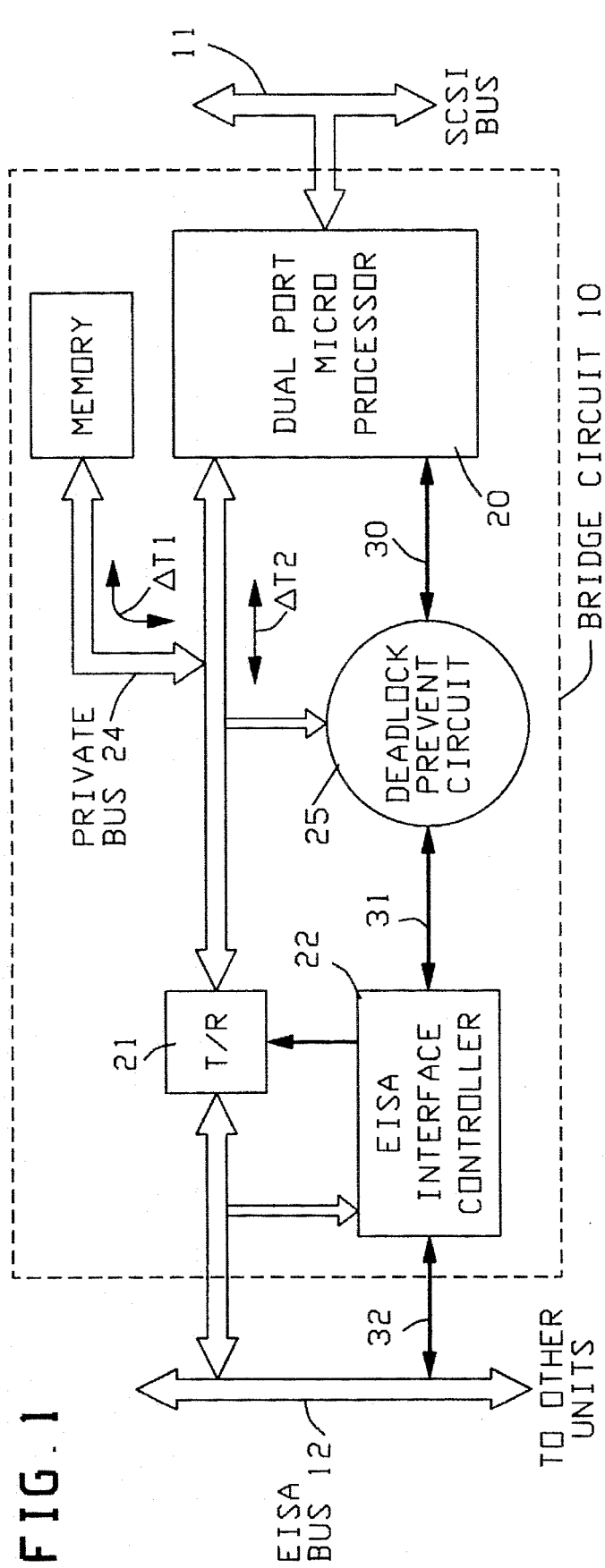
FIG. 1 is a block diagram of a bridge circuit which constitutes one preferred embodiment of the invention.
Figure 3:
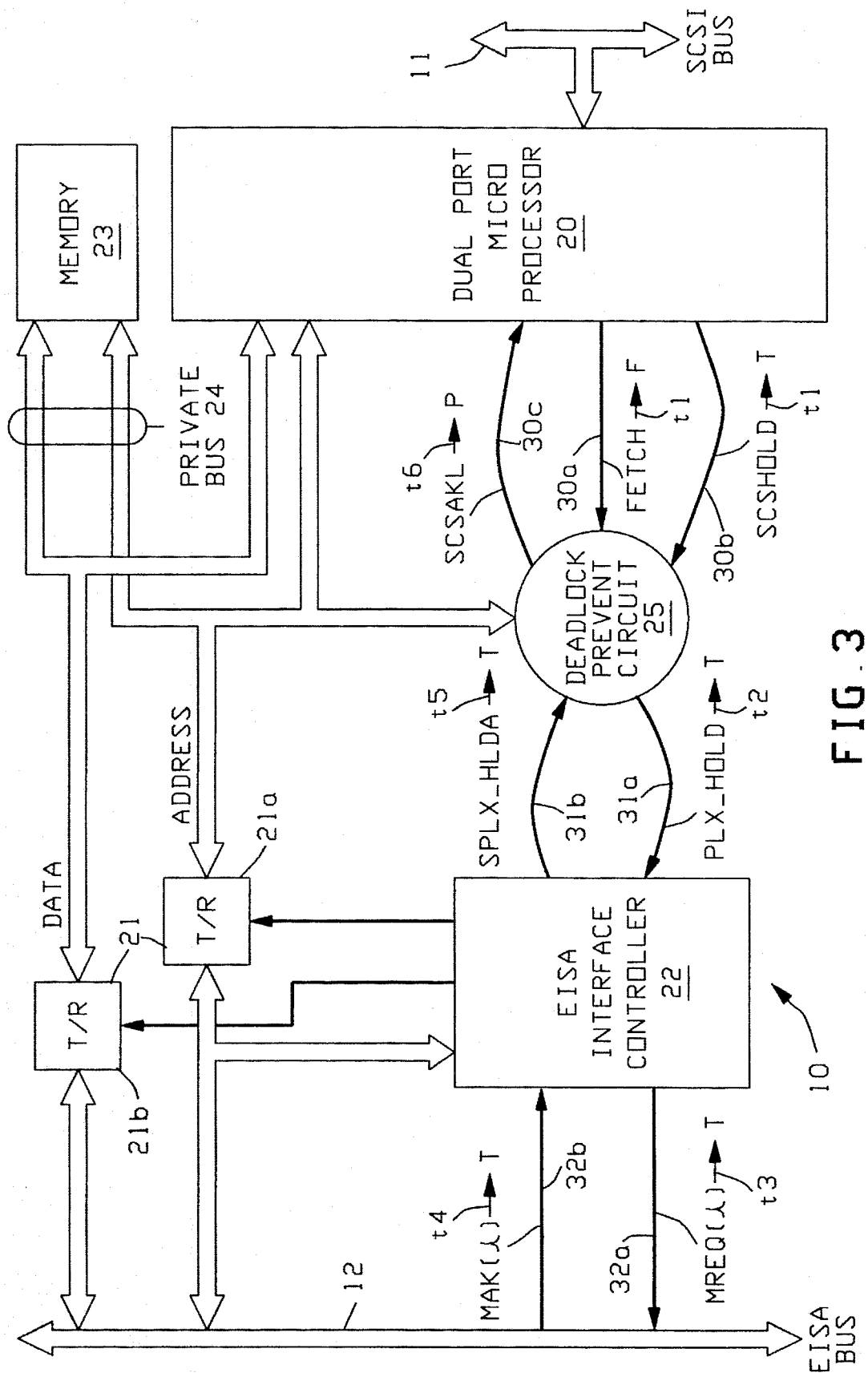

FIG. 3 illustrates a signal sequence which occurs within the FIG. 1 bridge circuit when the bridge circuit initially acquires the use of the EISA bus.

Figure 4:
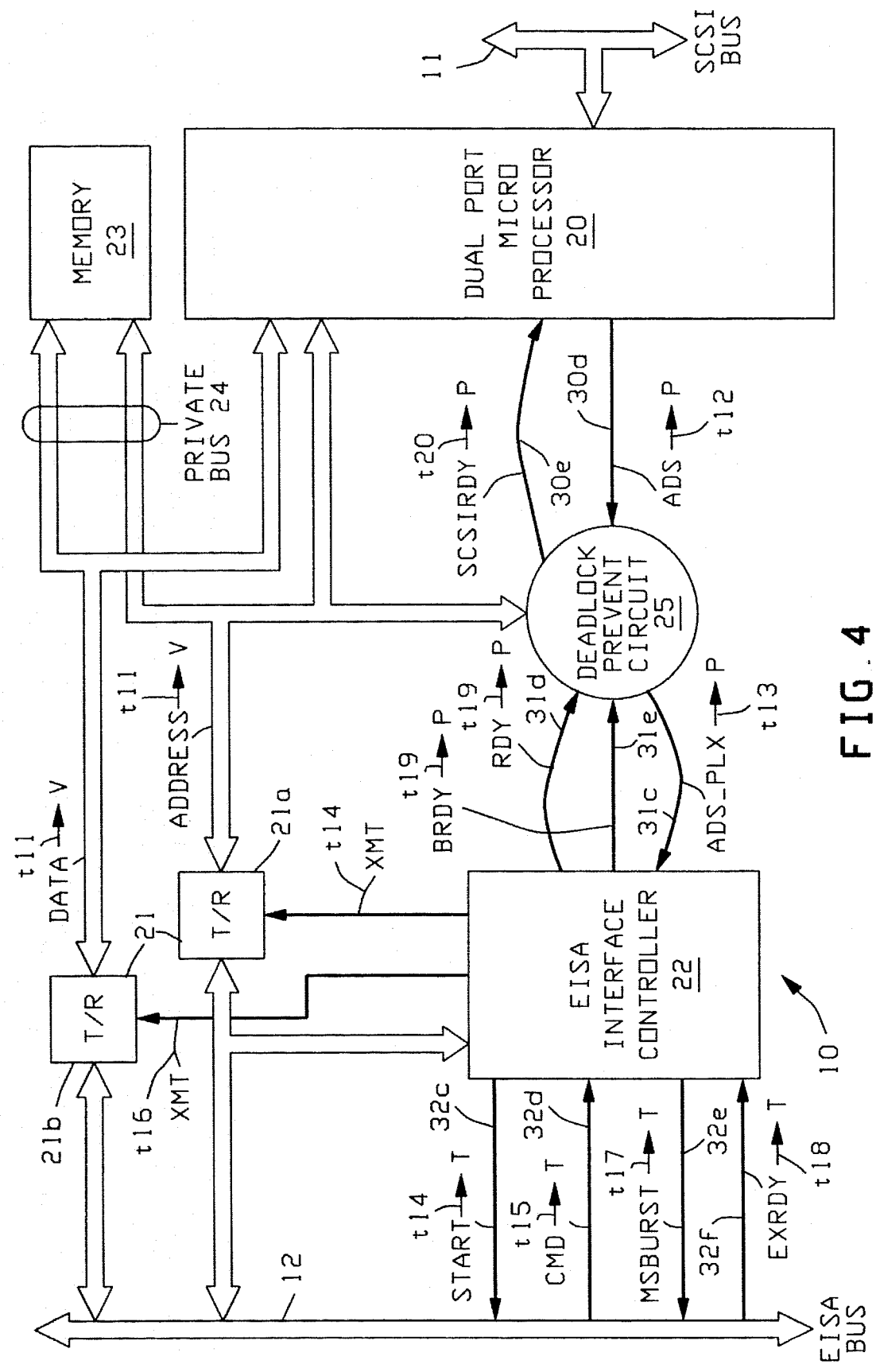

FIG. 4 illustrates another signal sequence which occurs in the FIG. 1 bridge circuit when a series of data transmissions occur between the bridge circuit and another unit on the EISA bus.

Figure 5:
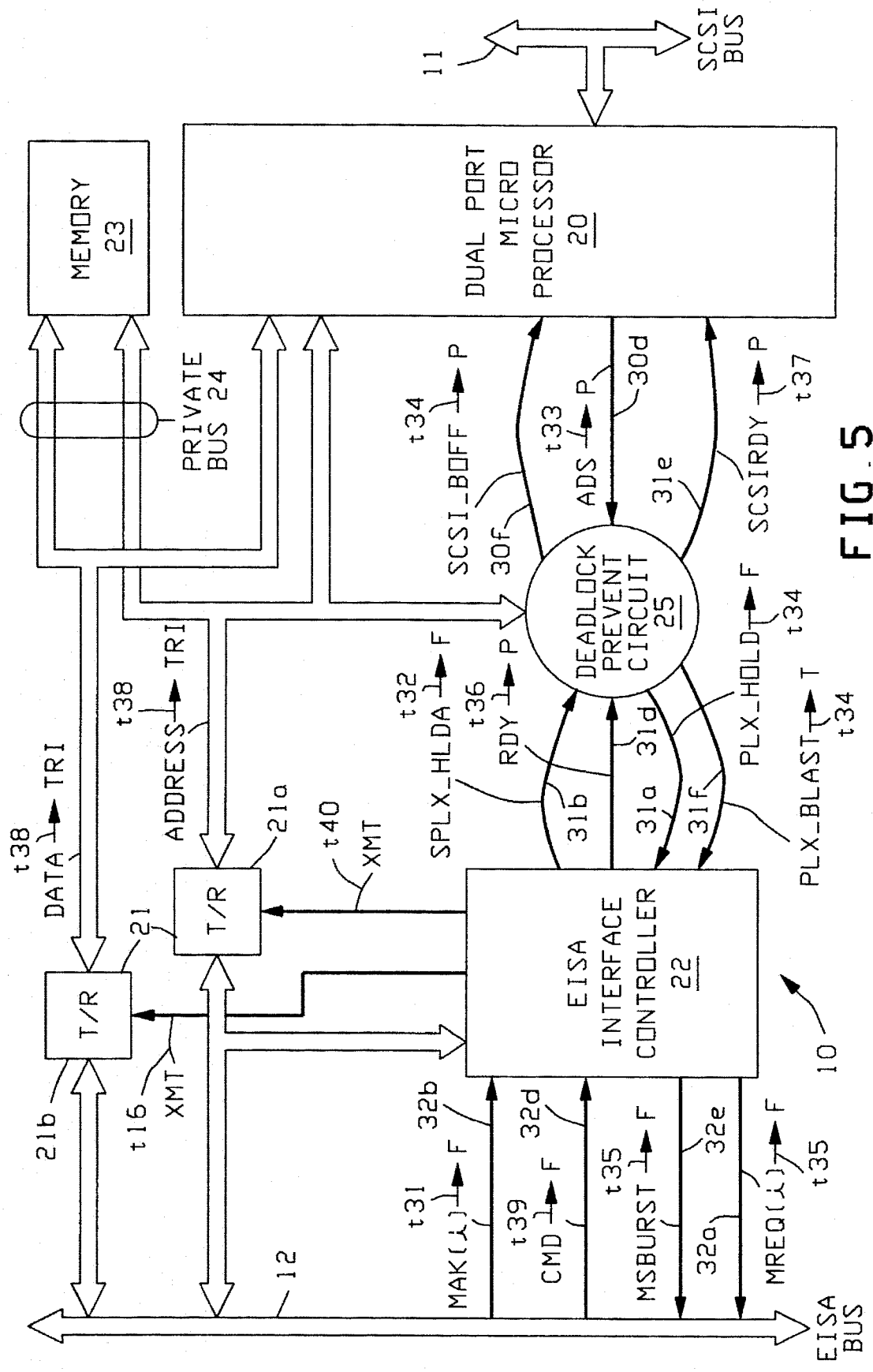

FIG. 5 illustrates still another signal sequence which occurs in the FIG. 1 bridge circuit when a unit of the EISA bus forces the bridge circuit to temporarily stop its series of data transmissions over the EISA bus.

Figure 6:
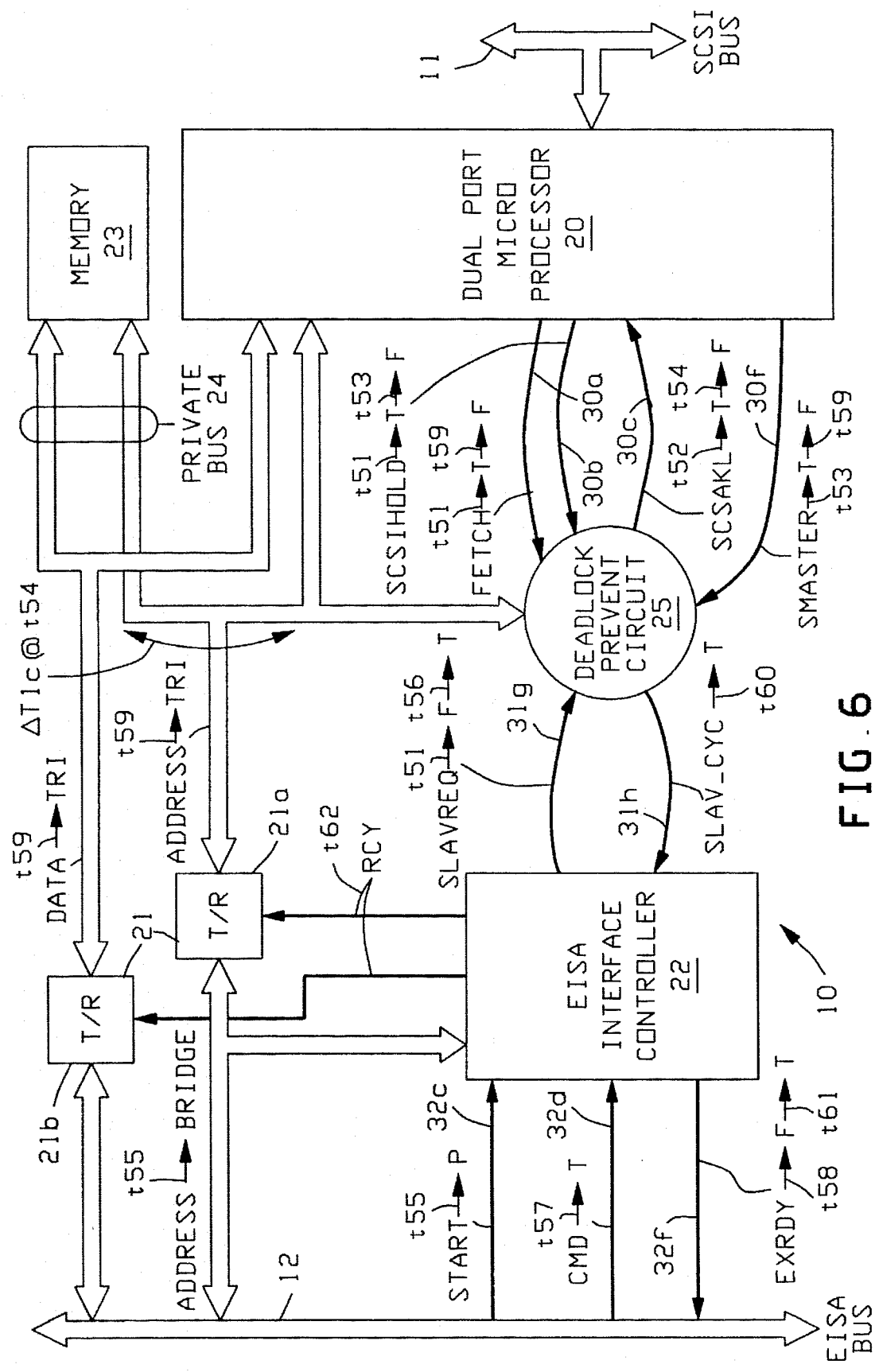

FIG. 6 illustrates yet another sequence of signals which occur in the FIG. 1 bridge circuit when an instruction is read from the bridge circuit's internal memory over the private bus.

Figure 7:
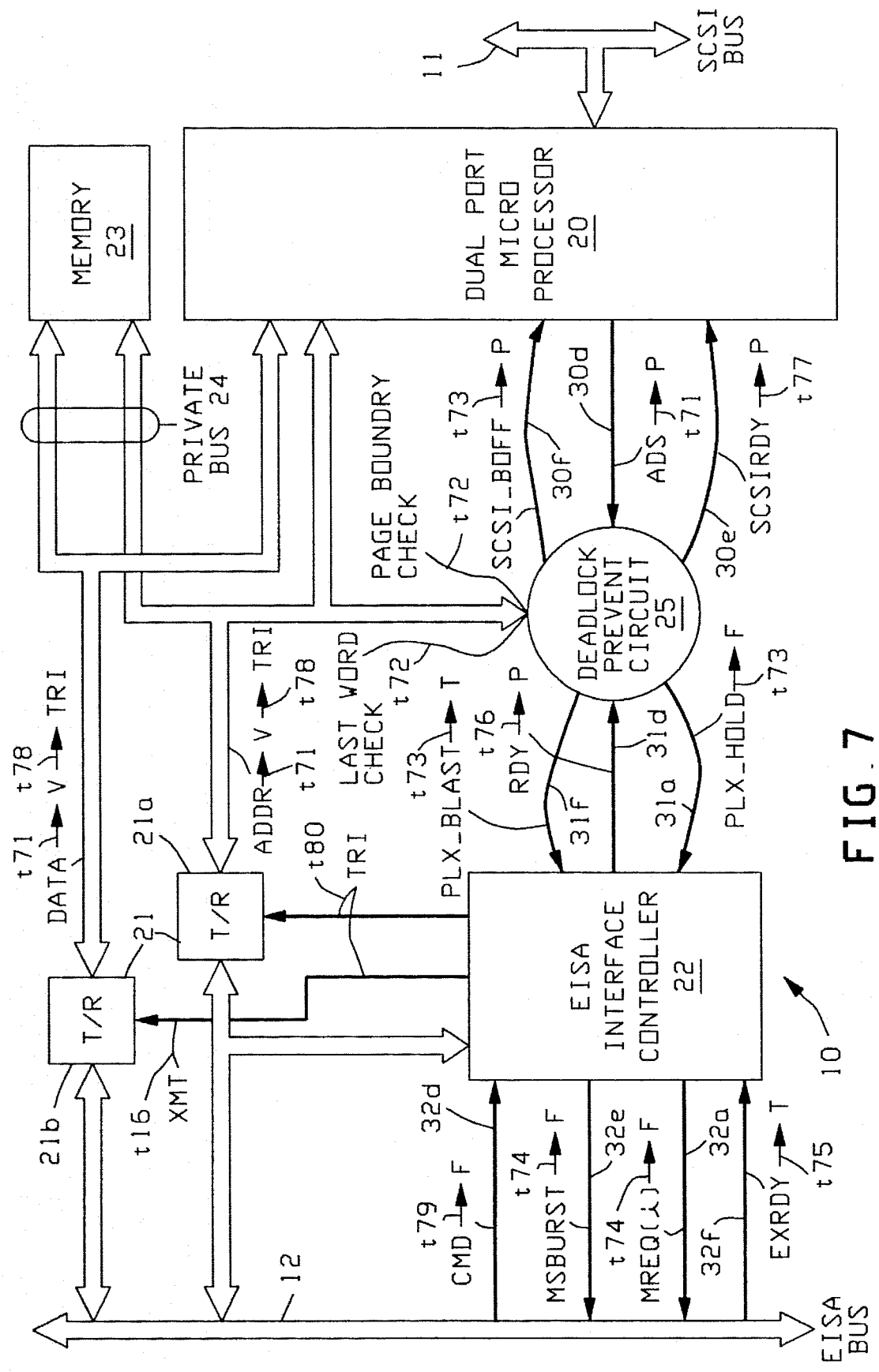

FIG. 7 illustrates still another signal sequence which occurs in the FIG. 1 bridge circuit when a series of data transmissions, between the bridge circuit and the EISA bus, is forced to temporarily stop due to a page boundary being crossed or due to the last transmission of the series ending on a non-double word address.

DETAILED DESCRIPTION

Referring now to FIG. 1, the structure and operation of a bridge circuit 10, which constitutes one preferred embodiment of the invention, will be described in detail. As can be seen in FIG. 1, this bridge circuit 10 intercouples a SCSI bus 11 and an EISA bus 12. Each of those busses, 11 and 12, have their own separate set of signal lines and signal protocol by which the bus is obtained and data is transferred; and the overall function of the bridge circuit 10 is to permit data to be transferred from the EISA bus 12 through the bridge circuit 10 to the SCSI bus 11; and vice versa.

Included within the bridge circuit 10 are the following major components: a dual port microprocessor 20, a set of EISA bus transmitters and receivers 21 (hereafter transceivers 21), an EISA bus interface controller circuit 22, a digital memory module 23, a private bus 24, and a deadlock prevention circuit 25. All of these components, 20–25, are intercoupled to each other within the bridge circuit 10 as shown in FIG. 1.

In one preferred embodiment of the bridge circuit 10, the above components 20–25 are implemented as follows. The microprocessor 20 is a NCR 53C7X0 integrated circuit chip. The transceivers 21 are 74ABT16543 and 74ABT16646 integrated circuit chips. The EISA bus controller circuit 22 is a PLX9020BV integrated circuit chip. The digital memory module 23 is a set of static RAM chips MT5C6408-25. The private bus includes a set of DATA lines which carry four bytes of data (one double word), and a set of ADDRESS lines. These ADDRESS lines, carry twenty four address signals $2^{23}$-$2^2$ which specify a double word address, four byte enable signals (one for each byte in a double word of DATA), and memory READ and WRITE lines which direct the memory module 23 to read and write. The deadlock prevention circuit 25 is a digital state machine which is made of a set of MACH210-12 and GAL22V10-7 integrated circuit chips.

Figure 2:
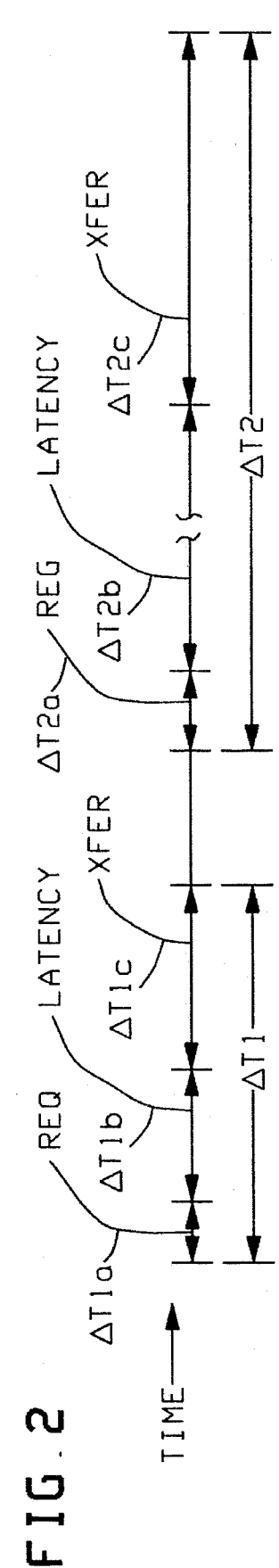
FIG. 2 is a timing diagram which shows various time intervals which occur when an instruction is read from the memory within the FIG. 1 bridge circuit, and when data is transferred between a unit on the EISA bus and the FIG. 1 bridge circuit.

Stored within the memory module 23 are various programs which the microprocessor 20 reads and executes. Each program consists of a set of instructions which tell the microprocessor 20 what to do. To read one of the instructions from the memory module 23, the microprocessor 20 utilizes the private bus 24 during a time interval $\Delta T1$ as shown in FIGS. 1 and 2.

4

Initially in an instruction read operation, the microprocessor 20 makes a request to use the private bus 24. This request occurs during time interval $\Delta T1a$. Then, if no data transfers are about to take place from the EISA bus 12 to the private bus 24, the private bus is immediately available for transferring an instruction from the memory module 23 to the microprocessor 20. Otherwise, if a data transfer is about to occur between the private bus 24 and the EISA bus 12, a latency time period $\Delta T1b$ is incurred. Thereafter a transfer time period $\Delta T1c$ occurs during which the microprocessor 20 sends an address on the private bus 24 to the memory module 23 and in return receives an instruction from the memory module 23 over the private bus.

Each instruction which the microprocessor 20 receives directs the microprocessor to perform some operation internally, or take some action on the SCSI bus 11, or take some action on the EISA bus 12, or any combination thereof. In the case where the microprocessor 20 initiates a data transfer on the EISA bus 12, that transfer takes place during a time interval $\Delta T2$ as shown in FIGS. 1 and 2.

To start an EISA bus data transfer operation, the microprocessor 20 makes a request to use the EISA bus 12. This request is made via a sequence of control signals on control lines 30, 31, and 32 which pass between the microprocessor 20, the EISA interface controller 22, and the deadlock prevention circuit 25. Next, after the request to use the EISA bus is made, a latency time period $\Delta T2b$ is incurred because the EISA bus is time-shared with many other units. Then, after the use of the EISA 12 is obtained, a transfer time period $\Delta T2c$ occurs in which data passes from the EISA bus through the transceivers 21 and over the private bus 24 to the microprocessor 20; or visa versa.

An important point about the above-described time intervals $\Delta T1$ and $\Delta T2$ is that $\Delta T1$ is much shorter than $\Delta T2$. One primary reason for this is that during the instruction read operation which occurs in the time period $\Delta T1$, the private bus latency time period on average is very small. Typically, while an instruction is being fetched from the memory 23 on the private bus 24, the EISA bus 12 is in use by units which are not transferring to/from the bridge circuit 10; and in that case, the latency time period $\Delta T1b$ is essentially zero.

By comparison, during the time interval $\Delta T2$, the EISA latency time period $\Delta T2b$ will usually be very large. This is because the use of the EISA bus 12 is always being sought by several of the units which connect to the EISA bus. On average, the time period $\Delta T2b$ will range from about twenty-four microseconds long to one-hundred microseconds and the number of other logic units on the EISA bus 12 ranges from one to seven.

Thus, by having the memory 23 coupled directly to the microprocessor 20 via the private bus 24, the EISA bus latency time period $\Delta T2b$ is avoided each time the microprocessor 20 fetches an instruction. However, by coupling the memory module 23 via the private bus 24 to microprocessor 20, certain potential deadlock sequences on the private bus 24 will arise. But, the function of the deadlock prevention circuit 25 is to send and receive various control signals on the connectors 30 and 31 such that these deadlock sequences are avoided.

Next, with reference to FIGS. 3–7, the details by which the deadlock prevention circuit 25 operates will be described. To begin, reference should be made to FIG. 3 wherein a signal sequence is shown by which the microprocessor 20 makes a request for and obtains the use of the EISA bus 12. In other words, the signal sequence of FIG. 3 occurs during the time intervals $\Delta T2a$ and $\Delta T2b$ in FIG. 2.

Initially in FIG. 3, the microprocessor 20 sends a pair of signals FETCH and SCSHOLD on conductors 30a and 30b to the deadlocked prevention circuit 25. FETCH is sent at time t1 in a false state (F), and SCSHOLD is sent at the same time in a true state (T).

In response thereto, the deadlock prevention circuit 25 sends a signal PLX_hold to the EISA interface controller 22. This PLX_HOLD signal is sent in a true state at time t2 on a conductor 31a.

Next, in response to the true PLX_HOLD signal, the EISA interface controller 22 sends a request signal MREQ(i) to the EISA bus 12. MREQ(i) is sent in a true state at time t3 on a conductor 32a; and this indicates to the EISA bus that the bridge circuit 10 is requesting the use of the EISA bus.

In response to the MREQ(i) signal, a bus arbitration circuit (not shown) on the EISA bus 12 determines when the bridge circuit 10 can use the EISA bus. This use of the EISA bus is allocated by the arbitrator in a time-shared fashion; and that gives rise to the latency time period $\Delta T2b$ in FIG. 2.

When the bridge circuit 10 is eventually granted the use of the EISA bus 12, it is sent an acknowledge signal MAK(i) in a true state. This signal MAK(i) is sent from the EISA bus 12 on a conductor 32b to the EISA interface controller 22 at time t4.

In response to the true MAK(i) signal, the EISA interface controller 22 sends a signal SPLX_HLDA in a true state to the deadlock prevention circuit 25. This signal SPLX_HLDA occurs on conductor 31b at time instant t5.

Lastly, in response to the true SPLX_HLDA signal, the deadlock prevention circuit 25 sends a signal SCSKL as a pulse (P) to the microprocessor 20. This SCSKL signal is sent on conductor 30c at time instant t6.

After the use of the EISA bus 12 is obtained as described above, the actual transfer of data between the microprocessor 20 and the EISA bus 12 will begin. During this data transfer, the sequence of control signals which occurs to and from the deadlock prevention circuit 25 is as shown in FIG. 4.

Initially in FIG. 4, the microprocessor 20 transmits a valid ADDRESS and valid DATA unto the private bus 24. This occurs at time instant t11 in FIG. 4, wherein the "V" on the private bus 24 indicates the DATA and ADDRESS are valid.

Next, at time instant t12, the microprocessor 20 sends a signal ADS to the deadlock prevention circuit 25. This signal ADS is sent as a pulse on a conductor 30d.

In response, the deadlock prevention circuit 25 sends a signal ADS_PLX to the EISA interface controller circuit 22. Signal ADS_PLX is sent as a pulse on conductor 31c at time instant t13.

Then, in response to the pulsed ADS_PLX signal, the EISA interface controller 22 sends a signal XMT to the transceivers 21a. Signal XMT enables the ADDRESS signals on the private bus 24 to pass through the transceivers 21 onto the EISA bus 12. This occurs at time instant t14.

Also at time t14, the EISA interface controller 22 sends a START signal in a true state to the EISA bus 12 on conductor 32c. This signal START indicates to the EISA bus that the data transfer is about to begin.

Next, the EISA interface controller 22 receives a CMD signal in a true state from the EISA bus 12. This CMD signal is received on a conductor 32d at time instant t15.

Then, the EISA interface controller 22 sends the XMT code to the transceivers 21b. This XMT code is sent at time instant t16; and it enables the DATA signals on the private bus 24 to pass through the transceivers 21b onto the EISA bus 12.

Lastly, the EISA interface controller 22 sends a MSBURST signal in a true state to the EISA bus 12. This true MSBURST signal is sent at time instant t17 on a conductor 32e; and it indicates to the EISA bus that the DATA being transferred is one double word (four bytes) of a series.

In response to the START signal, the EISA bus sends a true EXRDY signal to the EISA interface controller 22 when the EISA bus is ready to accept or send data. This EXRDY signal is sent in a true state on conductor 32f at time instant t18.

Thereafter, in response to EXRDY, the EISA interface controller sends a ready signal to the deadlock prevention circuit 25. BRDY signal is pulsed at time instant t19 on conductor 31e if MSBURST is still in a true state when EXRDY is sampled. BRDY indicates to the deadlock prevention circuit that consecutive data transfer will continue. RDY signal is pulsed at time instant t19 on conductor 31d if MSBURST is in a false state when EXRDY is sampled. RDY indicates to the deadlock prevention circuit that this is the last data transfer.

Lastly, in response to the pulsed BRDY or RDY signal, the deadlock prevention circuit 25 sends a pulsed SCSIRDY signal to the microprocessor 20. This SCSIRDY signal is sent on conductor 30e at time instant t20; and it indicates that the microprocessor 20 should now send another double word of DATA, along with its ADDRESS, on the private bus 24. Then, the FIG. 4 signal sequence is repeated with the exception that the ADS_PLX signal is not pulsed to the EISA interface controller.

Normally, the signal sequence of FIG. 4 will be repeated several times and terminated when the microprocessor 20 determines that all of data in the series has been transferred. However, as an alternative, the data transfer of FIG. 4 can be terminated in response an action that is initiated by another unit on EISA bus 12. Such a termination of the FIG. 4 data transfer is shown in FIG. 5.

Initially in FIG. 5, at time instant t31, signal MAK(i) is sent in a false state from the EISA bus 12 to the EISA interface controller 22. This false state of the MAK(i) signal indicates that another unit on the EISA bus 12 must be given the use of a EISA bus within a certain predetermined time interval.

In response to the false state of the MAK(i) signal, the EISA interface controller 22 causes signal SPLX_HLDA to go false. This occurs at time instant t32 on conductor 31b.

Thereafter, the deadlock prevention circuit 25 waits for the ADS signal to be pulsed by the microprocessor 20. That pulse occurs on conductor 30d at time instant t33; and it indicates that the transfer of another four bytes of data is starting to occur.

In response to the pulse of the ADS signal, the deadlock prevention circuit 25 sends a signal SCSI_BOFF in a true state to the microprocessor 20. This occurs at time instant t34 on conductor 30f; and it indicates that the microprocessor 20 must "back off" from using the EISA bus 12 and private bus 24. That is, after completing the transfer of one more double word of data, the microprocessor 20 must temporarily give up the EISA bus 12 and private bus 24.

At the same time instant t34, the deadlock prevention circuit 25 also sends signal PLX_HOLD in a false state to the EISA interface controller 22; and it sends signal PLX_BLAST in a true state to the EISA interface controller 22.

Then, in response to the signals PLX_HOLD and PLX_BLAST, the EISA interface controller 22 sends signal MREQ(i) and signal MSBURST in a false state back to the EISA bus 12. This occurs at time instant t35 on conductors 32a and 32e; and it indicates that the bridge circuit 10 is about to get off of the EISA bus.

Next, the EISA interface controller 22 sends signal RDY as a pulse to the deadlock prevention circuit 25. This occurs at time instant t36 on conductor 31d. Then, in response to the pulse of the RDY signal, the deadlock prevention circuit 25 sends the SCSIRDY signal as a pulse to the microprocessor 20. This occurs on conductor 30e at time instant t37.

In response to the pulse of the SCSIRDY signal occurring while signal SCSI_BOFF is true, the microprocessor 20, at time instant t38, tri-states all its internal transmitter which drive the private bus 24. These tri-stated transmitters are those which produce the DATA and the ADDRESS signals. While the microprocessor's internal transmitters are tri-stated, each of those transmitters operates as an open circuit; and that allows the DATA and ADDRESS signals on the private bus 24 to subsequently be driven from another unit on the EISA bus through the transceivers 21.

Next, the EISA bus 12 sends the CMD signal in a false state to the EISA interface controller 22. This occurs at time instant t39 on conductor 32d; and that terminates the use of the EISA bus by the bridge circuit 10.

Lastly, at time instant t40, the EISA interface controller 22 sends a signal TRI to the transceivers 21. Due to that TRI signal, all the transmissions from the private bus 24 to the EISA bus 12 are tri-stated so that the EISA bus 12 can now be used by other units.

One important point about the above-described FIG. 5 signal sequence is that by the end of the sequence, the microprocessor 20 has tri-stated its signal transmission on both the EISA bus 12 and the private bus 24. If, by comparison, the microprocessor 20 stops using just the EISA bus, and sends on the private bus the next set of DATA and ADDRESS signals to be transmitted, then a deadlock can occur.

To make the above deadlock actually happen, another data processing module which acquires the EISA bus need only attempt to send some data over the EISA bus to the microprocessor 20 or memory module 23. In that event, a deadlock will occur because the EISA bus has no capability to back off a module which has acquired the EISA bus and is attempting to acquire the private bus 24 in the bridge circuit 10; and the microprocessor 20 has no capability to back off of the private bus 24 until after it transfers the present DATA on the private bus to the EISA bus.

Turning now to FIG. 6, it illustrates a signal sequence which may occur in the bridge circuit 10 after the signal sequence of FIG. 5. In the FIG. 6 sequence, the microprocessor 20 uses the private bus 24 to address and read an instruction in the memory 23. This FIG. 6 signal sequence does not create a potential deadlock because the microprocessor 20 is not attempting to transmit any signals on EISA bus 12.

While the FIG. 6 instruction read is in progress, the EISA bus 12 can send signals to the bridge circuit 10 which indicate that another unit on the EISA bus 12 has data to send to the microprocessor 20 and/or memory module 23. If that data transfer takes place when the instruction fetch on the private bus 24 is in progress, a situation will occur wherein both the data from the EISA bus 12 and the instruction from the memory module 23 are being transmitted on the private bus 24 at the same time; and that will cause the data to be garbled.

Initially, in FIG. 6, the microprocessor 20 sends the signals FETCH and SCSHOLD to the deadlock prevention circuit 25. Signal FETCH is sent in a true state at time instant t51 on conductor 30a; and signal SCSHOLD is sent in a true state at time instant t51 on conductor 30b.

In response to these FETCH and SCSHOLD signals the deadlock prevention circuit 25 examines signal SLAVREQ on conductor 31g from the EISA interface controller 22. A true state of signal SLAVREQ indicates that some unit on the EISA bus 22 is attempting to send data to the bridge circuit 10; whereas a false state of the SLAVREQ signal indicates that no such attempt is being made.

In the illustrated FIG. 6 sequence, signal SLAVREQ is false at time instant t51; and thus, the deadlock prevention circuit 25 responds by sending signal SCSAKL in a true state back to the microprocessor 20. This occurs at time instant t52 on conductor 30c. If by comparison, signal SLAVREQ was true, then the deadlock prevention circuit 25 would send signal SCSAKL back to the microprocessor 20 in a false state.

In response to the true state of signal SCSAKL, the microprocessor 20 sends signal SMASTER in a true state back to the deadlock prevention circuit 25. This occurs at time instant t53 on conductor 30f; and the true SMASTER signal acknowledges that the microprocessor 20 can begin an instruction FETCH operation of the private bus 24. Also, at the same time instant t53, the microprocessor 20 sends the SCSHOLD signal on the conductor 30b in a false state.

Thereafter, starting at time instant t54, the actual instruction FETCH operation begins on the private bus 24. In other words, at time t54, the instruction transfer time period ΔT1c, which was shown in FIG. 2, begins. Also, at time instant t54, the deadlock prevention circuit 25 sends signal SCSAKL in a false state to the microprocessor 20 as a response to the true SMASTER signal.

During the instruction transfer period ΔT1c in FIG. 6, another unit on the EISA bus 12 initiates the transfer of data to the microprocessor 20 and/or memory 23. This occurs at time instant t55 by the receipt of a START pulse on conductor 32c along with an ADDRESS from the EISA bus which is preassigned to select the bridge circuit 10.

In response to the above START pulse and ADDRESS, the EISA interface controller 22 sends signal SLAVREQ in a true state to the deadlock prevention circuit 25. This occurs at time instant t56 on conductor 31g.

If the microprocessor 20 was not using the private bus 24 to fetch an instruction, the deadlock prevention circuit 25 would respond at time t57 by sending signal SLAV_CYC in a true state back to the EISA interface controller 22. However, since the true state of signal FETCH indicates that the microprocessor 20 is using the private bus 24, the deadlock prevention circuit 25 sends signal SLAV_CYC in a false state.

Meanwhile, at time instant t57, the EISA bus 12 continues in its attempt to send data to the bridge circuit 10 by generating signal CMD in a true state to the EISA interface controller 22. This occurs at time instant t57 on conductor 32d. However, since signal SLAV_CYC is false at that time, the EISA interface controller 22 prevents an actual data transfer from occurring on the EISA bus 12 by sending signal EXRDY in the false state back to the EISA bus. This occurs on conductor 32f at time instant t58.

Thereafter, when the instruction transfer time period ΔT1c on the private bus 24 is completed, the microprocessor 20 tri-states its internal transmitters of the ADDRESS and DATA signals; and at the same time, it sends the signals FETCH and SMASTER in a false state to the deadlock prevention circuit 25. This occurs on conductors 30a and 30f at time instant t59.

In response, the deadlock prevention circuit 25 sends signal SLAV_CYC in a true state to the EISA interface controller 22. This occurs at time instant t60 on conductor 31h. Then, the EISA interface controller 22 sends signal EXRDY in a true state to the EISA bus 12. That true state of signal EXRDY indicates that the actual data transfer from the EISA 12 to the microprocessor 20/memory 23 can begin.

To enable the data from the EISA bus 12 to pass onto the private bus 24, the EISA interface controller 22 sends a RCV signal to the transceivers 21. This occurs at time instant t62, at which time the transceivers 21 are the only source of signals on the private bus 24.

Next with reference to FIG. 7, still another signal sequence that occurs within the bridge circuit 10 will be described whereby a second potential occurrence of a deadlock on the private bus 24 is avoided. This FIG. 7 signal sequence occurs when a page boundary is crossed during a transfer of a series of data words between the bridge circuit 10 and the EISA bus 12. Such a transfer of data words, prior to the crossing of the page boundary, takes place as was previously described in connection with FIG. 4.

Initially, in the FIG. 7 sequence, the microprocessor 20 sends signal ADS as a pulse to the deadlock prevention circuit 25. This occurs at time instant t71 on conductor 30d; and it indicates that the microprocessor 20 is ready for the transfer of another double word of data to/from the EISA bus 12. In FIG. 7, the data is transferred to the EISA bus 12; and thus at time instant t71, the data which is to be transferred and the address for that data is placed by the microprocessor 20 on the private bus 24.

Each address on the private bus 24 is monitored by the deadlock prevention circuit 25. If that address is not the last double word address within a page, then the data transfer occurs as was previously described in conjunction with FIG. 4. However, if that address is the double word last address within the page, then that is detected by the deadlock prevention circuit at time instant t72.

In one embodiment, each page contains 1024 words of DATA which are consecutively addressed. Thus, the address of the last double word of a page has as ADDRESS where each of the ADDRESS bits $2^{10}$ through $2^2$ are "1".

In response to the detection of the last double word address within the page, the deadlock prevention circuit 25 sends signal SCSI_BOFF to the microprocessor 20 in a true state. This occurs on conductor 30f at time instant t73; and it indicates that the microprocessor 20 must temporarily give up the use of the EISA bus 12 because a page boundary is about to be crossed.

Also, at the same time instant t73, the deadlock prevention circuit 25 sends signal PLX_HOLD in a false state and signal PLX_BLAST in a true state to the EISA interface controller 22. These signals occur on conductors on 31a and 31f.

In response to the signals PLX_HOLD and PLX_BLAST, the EISA interface controller 22 sends MSBURST and MREQ(i) in a false state to the EISA bus. This occurs at time instant t74; and it indicates EISA bus termination by the bridge circuit 10.

Then in response to MSBURST and MREQ(i) being false and EXRDY being sampled true at t75, the EISA interface controller sends the RDY signal as a pulse back to the deadlock prevention circuit 25. This occurs at time instant t76 on conductor 31d. Then the deadlock prevention circuit 25 sends signal SCSIRDY as a pulse to the microprocessor 20. This occurs at time instance t77 on conductor 30e.

In response to the pulse of signal SCSIRDY and the SCSI_BOFF signal in the true state, the microprocessor 20 places its internal transmitters to the private bus 24 in a tri-state condition. As a result, the DATA and ADDRESS signals on the private bus 24 go to a tri-state (TRI) as indicated at time instant t78.

Then, the EISA bus 12 sends the CMD signal in a false state to the EISA interface controller 22. This occurs at time instant t79 on the conductor 32e; and the false state of the CMD signals indicates that the bridge circuit 10 can release the EISA bus 12.

Lastly, the EISA interface controller 22 sends a signal TRI to the transceivers 21 which places those transceivers in a tri-state condition and thereby isolates the private bus 24 from the EISA bus 12. This occurs at time instant t80.

As soon as the bridge circuit 10 stops using the EISA bus 12, another unit on the EISA bus can initiate a data transfer to the microprocessor 20 and/or memory 23 in the bridge circuit 10. In order for such a data transfer to occur, the microprocessor 20 cannot have the next set of DATA and ADDRESS signals sent out on the private bus 24 and be attempting to acquire the EISA bus. Otherwise, a deadlock situation would occur wherein the microprocessor 20 has control of the private bus and is attempting to acquire the EISA bus, while another unit on the EISA bus has control of the EISA bus and is attempting to acquire the private bus.

As a variation of the FIG. 7 sequence, the microprocessor 20 also temporarily terminates its use of the EISA bus 12 whenever the last address for a series of data word transfers does not end on a double word boundary. In that case, all of the data words of the series, except for the last data word, will be sent one after the other in a burst mode as was described in conjunction with FIG. 4. Then, when the last word of the sequence is to be transferred, the microprocessor 20 stops using the EISA bus 12 in accordance with FIG. 7; and thereafter the microprocessor 20 re-acquires the use of the EISA bus and transfers the last data word in accordance with FIGS. 3 and 4.

By monitoring the ADDRESS signals on the private bus 24, the deadlock prevention circuit 25 is able to detect when a series of data transfers is ending on a non-double word boundary. Those address signals include four byte enable signals, one for each byte of the data word that is to be transferred. If any one of those byte enable signals is not true, while signal MSBURST is true, then the data transfer is ending on a non-double word boundary.

Thus, at time instant t72, the above signal condition is checked for by the deadlock prevention circuit 25. If that signal condition is detected, then the deadlock prevention circuit 25 responds by sending signal SCSI_BOFF in a true state back to the microprocessor 20 at time instant t73 and the entire signal sequence from t74 to t80 in FIG. 7 is repeated.

At some time after instant t78, the microprocessor 20 will again request the use of the EISA bus 12 by initiating the signal sequence with FIG. 3. At the same time, another unit on the EISA bus 12 may attempt a data transfer from the EISA bus 12 to the microprocessor 20 or the memory 23. If such a data transfer occurs, no deadlock situation will arise on the private bus 24 since at time instant t78, all of the internal transmitters of the microprocessor 20 were tri-stated as previously described.

One preferred embodiment of the invention has now been described in detail. In addition, however, various changes and modifications can be made to the above-described preferred embodiment without departing from the nature and spirit of the invention.

For example, the microprocessor 20 is not limited to a NCR53C7X0 integrated circuit chip. Instead, the microprocessor 20 may be any microprocessor which is capable of being connected to the private bus 24 and the EISA bus 11.

Likewise, the EISA interface controller is not limited to a PLX9020BV integrated circuit chip. Rather, the EISA interface controller may be any logic circuit which interfaces with the EISA bus via the control signals on conductors 32a–32d as described.

Similarly, the memory module 23 is not limited to be constructed of any one particular type of integrated memory circuit chip. Instead, the memory module can be made of any type of static RAM chip, dynamic RAM chip, or read-only memory chip.

Likewise, the deadlock prevention circuit 25 is not limited to the MACH210-12 and GAL11V10-7 integrated circuit chips. Rather, the deadlock prevention circuit 25 may be any digital state machine which is intercouples the microprocessor 20 and the EISA interface controller 22 as described. Thus, for example, the deadlock prevention circuit may be a state machine which is implemented as a single application specific integrated circuit chip (ASIC).

Also, the page boundaries which the deadlock prevention circuit detects in FIG. 7 are not limited to 1024 word page boundaries. Instead, any size page boundary can be detected. For example, the last double word address in a 2048 word page can be detected as the ADDRESS bits $2^{11}$ through $2^2$ being "1"; and the last double word address in a 512 word page can be detected as the ADDRESS bits $2^9$ through $2^2$ being "1".

Accordingly, it is to be understood that the present invention is not limited to the described preferred embodiment but is defined by the appended claims.

What is claimed is:

1. An improved bridge circuit, between a SCSI bus and a EISA bus, which includes—1) a dual port microprocessor having a first I/O port which couples to said SCSI bus and having a second I/O port which has a direct connection through transceivers to said EISA bus, and 2) an EISA interface controller, having control lines coupled to said EISA bus and said transceivers, which enable said microprocessor to request and use said EISA bus in time-shared fashion, wherein the improvement comprises:

a single one-port memory module, having a direct connection to said second I/O port of said microprocessor which together with said direct connection to said transceivers form a private bus, that is time-shared, for a) sending instructions directly to said microprocessor without generating any signals on said EISA bus, and for b) sending data between said SCSI bus and said EISA bus; and, a deadlock prevention circuit, coupled to said microprocessor and said EISA interface controller, for detecting the occurrence of a predetermined event during a series of data transmissions between said microprocessor and said EISA bus, and in response thereto, for directing said microprocessor to stop said data transmissions over said EISA bus and private bus before the end of said series and tri-state its transmissions thereon, whereby another module on said EISA bus can acquire the use of both said EISA bus and said private bus without becoming deadlocked with said microprocessor over said time-shared use of said private bus.

2. A bridge circuit system according to claim 1 wherein said predetermined event is the receipt of signals from said EISA bus, while said microprocessor is using said EISA bus, which indicate that said microprocessor must temporarily stop using said EISA bus.

3. A bridge circuit according to claim 2 wherein said signals which indicate that said microprocessor must temporarily stop using said EISA bus include a transition of a MAK(i) signal from a True state to a False state while said EISA bus controller is generating a MSBURST signal in a True state.

4. A bridge circuit according to claim 1 wherein said predetermined event is the transmission of address signals, from said microprocessor to said EISA bus, which specify an address at the end of a page.

5. A bridge circuit according to claim 4 wherein said address signals which specify as address at the end of a page include a set of address bits of consecutive power each of which is in a True state.

6. A bridge circuit according to claim 1 wherein said predetermined event is the transmission of signals from said microprocessor to said EISA bus which indicate a data transmission between said microprocessor and said EISA bus is ending on a non-word boundary.

7. A bridge circuit according to claim 6 wherein said transmission of signals from said microprocessor includes at least one True byte enable signal and one False byte enable signal, while said EISA bus controller is generating a MSBURST signal in a True state.

8. A bridge circuit according to claim 1 wherein said deadlock prevention circuit is a digital logic state machine.

9. A bridge circuit according to claim 1 wherein said microprocessor is a NCR 53C7X0 integrated circuit chip.

10. A bridge circuit according to claim 1 wherein said EISA bus controller is a PLX 9020BV integrated circuit chip.

11. A bridge circuit according to claim 1 wherein said memory module is a read/write integrated circuit memory module.

12. A bridge circuit according to claim 1 wherein said memory module is a read-only integrated circuit memory module.

* * * * *